United States Patent
Harmon et al.

(10) Patent No.: US 7,580,518 B2
(45) Date of Patent: Aug. 25, 2009

(54) DUAL-AXES HINGE PART FOR HINGED COMPONENTS

(75) Inventors: Roger W. Harmon, Crystal Lake, IL (US); Roger W. Ady, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 684 days.

(21) Appl. No.: 11/000,722

(22) Filed: Dec. 1, 2004

(65) Prior Publication Data
US 2006/0112519 A1 Jun. 1, 2006

(51) Int. Cl.
*H04M 1/00* (2006.01)
*H04M 9/00* (2006.01)

(52) U.S. Cl. .............................. 379/433.13; 379/433.11; 455/575.3

(58) Field of Classification Search ............ 379/428.01, 379/433.01, 433.11, 433.13; 455/90.3, 575.1, 455/573.3; 248/917, 928, 287.1, 276.1
See application file for complete search history.

(56) References Cited

U.S. PATENT DOCUMENTS

| | | | |
|---|---|---|---|
| 4,086,519 | A | 4/1978 | Persson |
| 4,594,750 | A | 6/1986 | Carcas |
| 4,747,122 | A | 5/1988 | Bhagat et al. |
| 5,168,221 | A | 12/1992 | Houston |
| 5,189,632 | A | 2/1993 | Paajanen et al. |
| 5,274,882 | A | 1/1994 | Persson |
| 5,276,916 | A | 1/1994 | Pawlish et al. |
| 5,278,779 | A | 1/1994 | Conway et al. |
| 5,332,965 | A | 7/1994 | Wolf et al. |
| 5,494,447 | A | 2/1996 | Zaidan |
| 5,625,673 | A | 4/1997 | Grewe et al. |
| 5,661,632 | A | 8/1997 | Register |
| 5,682,529 | A | 10/1997 | Hendry et al. |
| 5,881,150 | A | 3/1999 | Persson |

(Continued)

FOREIGN PATENT DOCUMENTS

EP   1 429 524 A1   9/2002

(Continued)

OTHER PUBLICATIONS

Motorola, Inc., Motorola MPx one of First to Utilize New Windows Mobile 2003 Second Edition Software:, http://www.motorola.com/mediacenter/news/detailpf/0,,4034_3395_23,00.html, Mar. 24, 2004, 2 pages.

*Primary Examiner*—Tuan D Nguyen
(74) *Attorney, Agent, or Firm*—Charles W. Bethards; Lawrence J. Chapa (57) ABSTRACT

A dual-axes hinge part (106) defines a lower hinge (132) and an upper hinge (130) of an electronic device (100). The upper hinge (130) permits a component, such as a display member (102) to pivot with respect to the hinge part (106) in a portrait mode. The lower hinge (132) permits both the display member (102) and the hinge part (106) to pivot with respect to a base (104) in a landscape mode. The axes of the hinges (130, 132) cross one another and lie in different planes. The hinge part (106) conforms to the shapes of the housing of the display member (102) and the housing of the base (104) and has no parts that project substantially beyond the boundaries of the display member (102) and the base (104). Thus, the hinge part (106) provides dual-axes functionality while not detracting from the aesthetics of the electronic device (100).

22 Claims, 5 Drawing Sheets

U.S. PATENT DOCUMENTS

| | | |
|---|---|---|
| 5,926,119 A | 7/1999 | Lindeman et al. |
| 5,933,783 A | 8/1999 | Kawakami et al. |
| 6,002,946 A | 12/1999 | Reber et al. |
| 6,009,336 A | 12/1999 | Harris et al. |
| 6,014,573 A | 1/2000 | Lehtonen et al. |
| 6,088,240 A | 7/2000 | Steinhoff et al. |
| 6,115,616 A | 9/2000 | Halperin et al. |
| 6,249,672 B1 | 6/2001 | Castiel |
| 6,266,236 B1 | 7/2001 | Ku et al. |
| 6,385,463 B1 | 5/2002 | Lieberman et al. |
| 6,549,789 B1 | 4/2003 | Kfoury |
| 6,587,675 B1 | 7/2003 | Riddiford |
| 6,658,272 B1 | 12/2003 | Lenchik et al. |
| 6,728,557 B1 | 4/2004 | Tracy et al. |
| 6,766,181 B1 | 7/2004 | Newman et al. |
| 6,781,824 B2 | 8/2004 | Krieger et al. |
| 6,830,456 B2 | 12/2004 | Obermeyer |
| 6,839,576 B2 | 1/2005 | Aagaard et al. |
| 6,976,861 B2 | 12/2005 | Mc William et al. |
| 7,027,846 B2 | 4/2006 | Pan |
| 7,239,898 B2 | 7/2007 | Lenchik et al. |
| 7,257,430 B2 | 8/2007 | Lenchik et al. |
| 2001/0019946 A1 | 9/2001 | Okuda |
| 2002/0032010 A1 | 3/2002 | Okuda |
| 2003/0073414 A1 | 4/2003 | Capps |
| 2004/0067783 A1 | 4/2004 | Lenchik et al. |
| 2004/0110529 A1 | 6/2004 | Watanabe et al. |
| 2004/0127266 A1 | 7/2004 | Aagaard et al. |
| 2004/0137940 A1 | 7/2004 | Matsunami |
| 2004/0198249 A1 | 10/2004 | Grifffin |
| 2004/0204059 A1 | 10/2004 | Wong et al. |
| 2005/0148375 A1 | 7/2005 | DeLine |
| 2005/0257343 A1 | 11/2005 | Gupte |
| 2006/0048338 A1 | 3/2006 | Lowry et al. |
| 2007/0050946 A1 | 3/2007 | Shih et al. |

FOREIGN PATENT DOCUMENTS

| | | |
|---|---|---|
| WO | 9819434 A1 | 5/1998 |

DUAL-AXES HINGE PART FOR HINGED COMPONENTS

FIELD OF THE INVENTION

This invention relates in general to portable electronic devices with hinged components, such as hinged displays, and in particular to portable electronic devices having hinged components that can pivot about two axes.

BACKGROUND OF THE INVENTION

Recently, portable electronic devices have been modified to include more features and to perform more functions. For example, portable telephones often include features normally found in personal digital assistants (PDAs), and PDAs often include features normally found in portable telephones. Further, mobile telephones and PDAs often include features normally found in two-way messaging devices. Such integration of features presents a problem with regard to the orientation of some components, such as a hinged display component with respect to a keypad. A landscape-oriented display is better suited to some applications, and a portrait-oriented display is better suited to others. For example, a portrait-oriented display is normally preferred for voice communications, and a landscape-oriented display is normally preferred for gaming or messaging. However, dual-axis hinges for supporting hinged displays have tended to be bulky and complicated. The complexity increases costs and increases the likelihood of failure. The bulkiness of such hinges tends to harm the aesthetics of the electronic device in which they are employed.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

In overview, the present disclosure concerns hinge parts for hinged components such as those on electronic devices including laptop computers, portable video players, handheld computers, wireless messaging devices, portable game players, GPS mapping devices, pagers, portable dictionaries, portable book readers, personal digital assistants, cellular telephones, devices that integrate features of any two or more of these, and equivalents thereof.

As further discussed below various inventive principles and combinations thereof are advantageously employed to provide a dual-axis hinge part for hinged components.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, upper and lower and the like are used solely to distinguish one from another entity or action without necessarily requiring or implying any actual such relationship or order between such entities or actions.

The terms "a" or "an" as used herein are defined as one or more than one. The term "plurality" as used herein is defined as two or more than two. The term "another" as used herein is defined as at least a second or more. The terms "including," "having" and "has" as used herein are defined as comprising (i.e., open language). The term "coupled" as used herein is defined as connected, although not necessarily directly and not necessarily mechanically.

Figure 1:
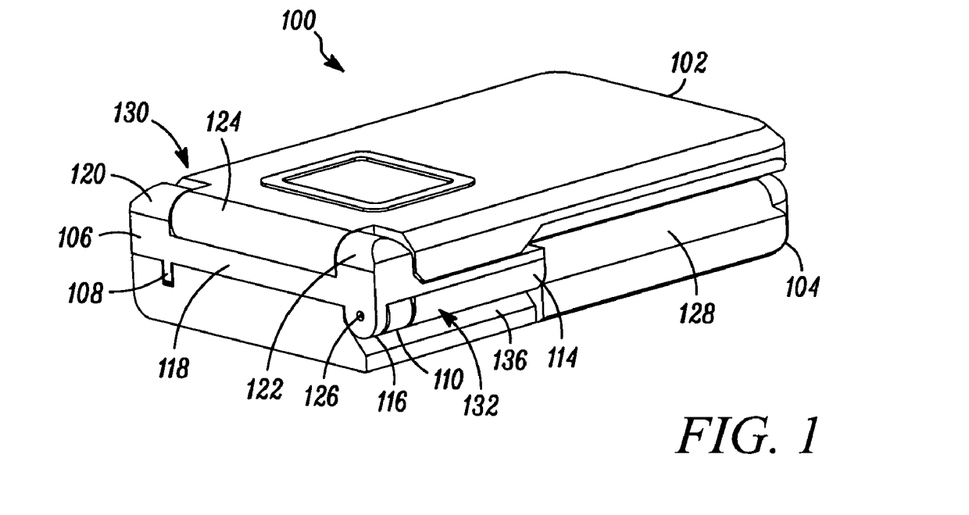
FIG. 1 is an exemplary perspective view of a portable electronic device that includes a hinge part in accordance with the invention.

FIG. 1 shows a portable electronic device 100 that includes a hinged component, such as a display member 102 (which is sometimes referred to as a flip) and a base 104. In the illustrated embodiment, the electronic device 100 is, for example, a portable telephone. A hinge part 106 connects the display member 102 to the base 104. The hinge part 106 permits the display member 102 to pivot using either of a lower hinge 132 or an upper hinge 130. That is, the display member 102 can pivot about a first axis or a second axis. Thus, the display member 102 can be oriented in a landscape mode (See FIG. 2) or a portrait mode (See FIG. 3).

As shown in FIG. 1, the hinge part 106 permits the electronic device 100 to have a conventional rectangular shape without awkward projections, which detract from the aesthetic appearance of the electronic device 100. The ends of both hinges 130, 132 lie generally within the boundaries of the housing of the electronic device 100, thus similarly avoiding projections and irregularities. For example, the upper hinge 130 is no wider than the display member 102, and the lower hinge 132 is no longer than the base 104. Although parts of the upper hinge 130 project upward from the base 104, the upper hinge 130 generally does not project above the display member 102 when the display member 102 is closed as in FIG. 1. In other words, the hinge part 106 generally conforms to the shapes of the base 104 and the display member 102. Also, the axes of the hinges 130, 132 are perpendicular and lie in different planes (the axes are spaced apart), which makes the electronic device 100 compact and contributes to the pleasing appearance of the electronic device 100.

Generally, the hinge part 106 is L-shaped and includes a lower hinge member 114, which forms part of the lower hinge 132 and extends along one side of the electronic device 100. The lower hinge member 114 rotates with respect to the base 104 about the first, or lower, hinge axis when the display member 102 is pivoted into the landscape mode. An upper hinge member 118, which forms part of the upper hinge 130 and extends along an end of the electronic device 100, is perpendicular to the lower hinge member 114. The upper hinge member 118 defines a second, or upper, hinge axis, which is perpendicular to and lies in a different plane than the lower hinge axis. The hinge part 106 can be die-cast metal, or the hinge part 106 can be made by a metal injection molding process, for example. The material of the hinge can be steel, magnesium, zinc, or aluminum, for example.

Both ends of the lower hinge member 114 are pivotally supported by the base 104. A distal end of the lower hinge member 114 is pivotally supported by an outer hinge block 128 of the base 104. An inner support block 110 of the base 104 fits within a cavity 614 (See FIG. 6) of the lower hinge member 114. The lower hinge member 114 includes an end support 116, which includes an opening 126 for receiving a hinge pin, or pintle 820 (See FIG. 8) to pivotally join the inner support block 110 of the base 104 to the end support of the lower hinge member 114. In the illustrated embodiment, the lower hinge 132 is a friction-type hinge, which holds its position with friction and requires manual force to change position. When a friction-type hinge is employed, the display member 102 stays in a given position set by the user until manually repositioned. Small forces such as that of gravity on the display member 102 cannot overcome the frictional resistance in the hinge and thus cannot cause the display member 102 to pivot. Such a friction-type hinge is a well known type of hinge and thus reduces costs by incorporating existing technology. As those skilled in the art will readily recognize, other known types of hinges can serve as the lower hinge 132 to pivotally couple the lower hinge member 114 to the base 104.

The upper hinge member 118 permits the display member 102 to pivot about the upper hinge axis when the display member 102 is pivoted into the portrait mode. The upper hinge member 118 normally remains in its closed position, as shown in FIG. 1, when the display member 102 is moved from a closed position to the portrait mode. Thus, when the display member 102 is used in the portrait mode, the upper hinge member 118 behaves like a conventional, fixed hinge support.

The second hinge support includes a proximal pivot block 122 and a distal pivot block 120, which pivotally support a proximal end 124 of the display member 102. The pivot blocks define the ends of the upper hinge 130. The pivot blocks 120, 122 conform to the shape of the display member 102 and the base 104 so that they do not project substantially beyond the surfaces of the display member 102 and the base 104. Thus, the hinge part 106 allows the electronic device 100 to have the pleasing aesthetic appearance of a conventional, rectangular, folding electronic device while permitting two-axes functionality.

The pivot blocks 120, 122 per se can be the same as pivot blocks found on conventional electronic devices such as conventional portable telephones. Thus, the upper hinge 130 can accommodate conventional display members without changes. Thus, the hinge part 106 can reduce costs by allowing the use of existing parts.

Figure 2:
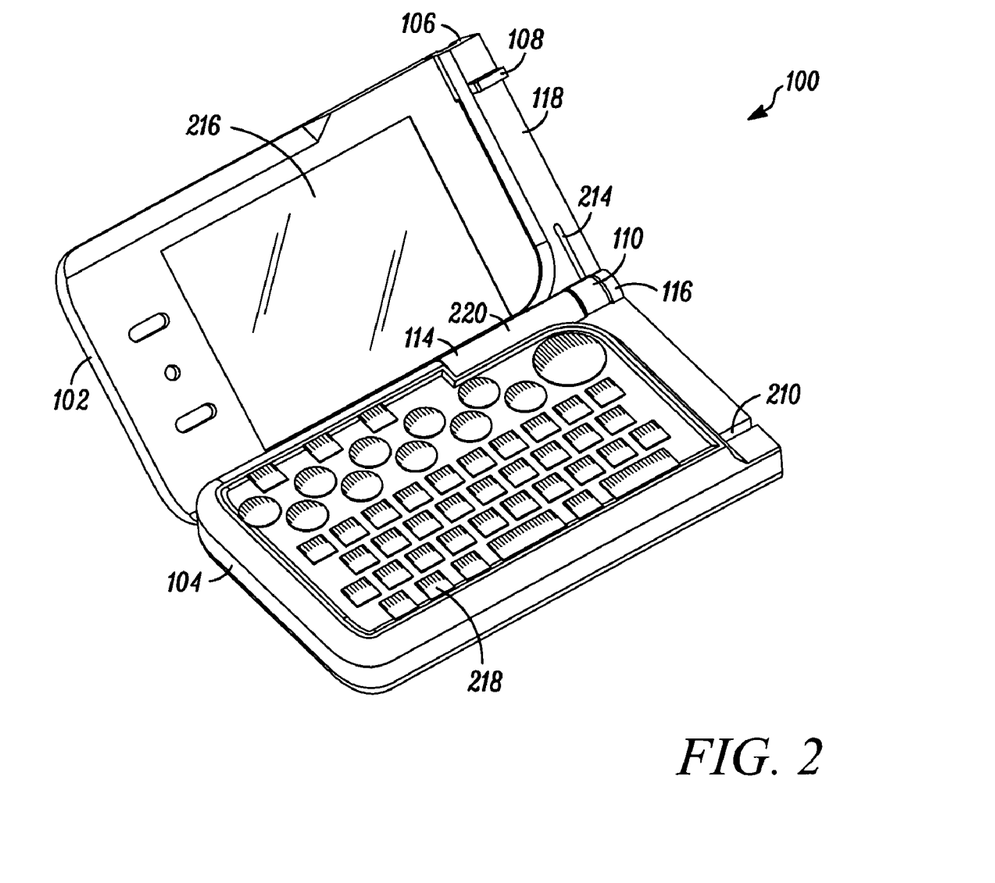
FIG. 2 is a perspective view of the electronic device of FIG. 1 in which the display is in a landscape orientation.

The upper hinge member 118 can include a blade 108, which projects into a corresponding slot 210 (See FIG. 2). The blade 108 can form part of a conventional latch mechanism such as those that secure displays on conventional laptop computers. That is, the blade 108 can include an opening (unillustrated) through which a latch hook (not shown) projects to latch the upper hinge member 118 to the base 104. A push button can be coupled to the hook for manually releasing the blade 118 and permitting the upper hinge member 118 to pivot, which is a common feature of hinged laptop computer displays. Alternatively, the blade can form part of a detent mechanism for providing slight resistance against opening the display member 102 into the landscape mode. In addition, the blade 108 can actuate a switch (not illustrated) to indicate closure of the upper hinge member 118 to a controller (unillustrated) inside the electronic device 100. Also, a magnet (not illustrated) can be employed to hold the upper hinge member 118 against the base 104.

FIG. 2 shows the electronic device 100 in landscape mode in which a display 216 is landscape-oriented. As shown, the electronic device 100 includes a keypad 218, which may be used to type messages in a messaging mode of the electronic device 100. In the landscape mode, the blade 108 is separated from the slot 210 and the hinge part 106 is pivoted about the lower hinge axis. In this position, an underside of the upper hinge member 118 is exposed. As shown in FIG. 2, an upper slot 214 can be formed in the upper hinge member for a purpose that is described below. The upper slot 214 can be covered with a cover (not illustrated) to provide a more pleasing appearance.

In addition, in the landscape mode, an underside of the lower hinge member 114 is exposed. FIG. 2 shows that a cover 220 can be employed to cover the underside of the lower hinge member 114 for a more pleasing appearance. The cover 220 can be, for example, a thin sheet of metal or plastic adhered to the lower hinge member 114. The cover 220 of the illustrated embodiment is thin and thus does not interfere with the operation of the lower hinge 132.

Figure 3:
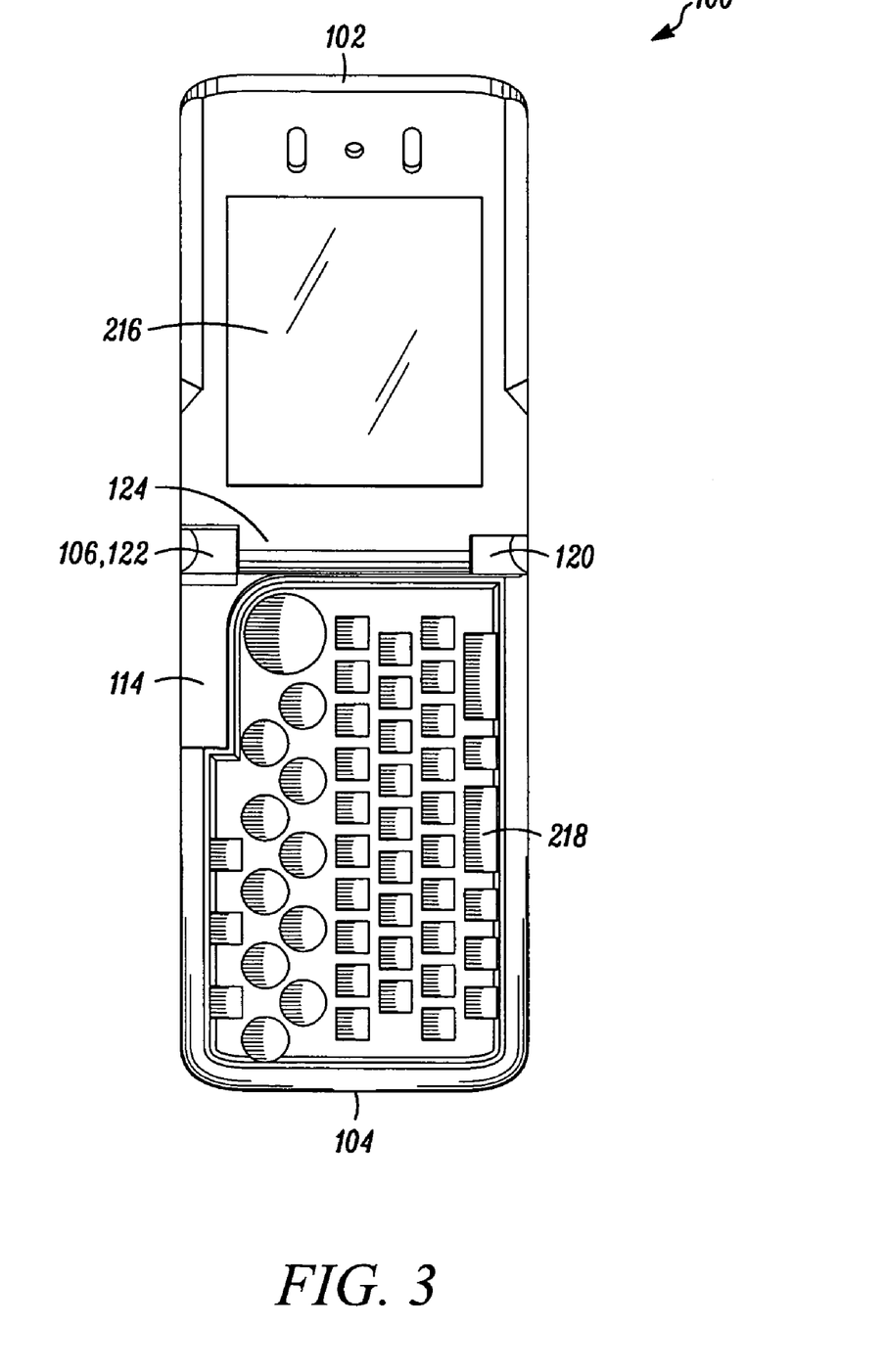
FIG. 3 is a plan view of the electronic device of FIG. 1 in which the display is in a portrait orientation.

FIG. 3 shows the electronic device in the portrait mode, in which the hinge part 106 is not pivoted from the base 104 but the display member 102 is pivoted away from the keypad 218. In this mode, the upper hinge 130 operates much like a display hinge of a conventional two part (clamshell-type) portable telephone. In the portrait mode of the illustrated embodiment, an upper side of the lower hinge member 114 is exposed to the user.

Figure 4:
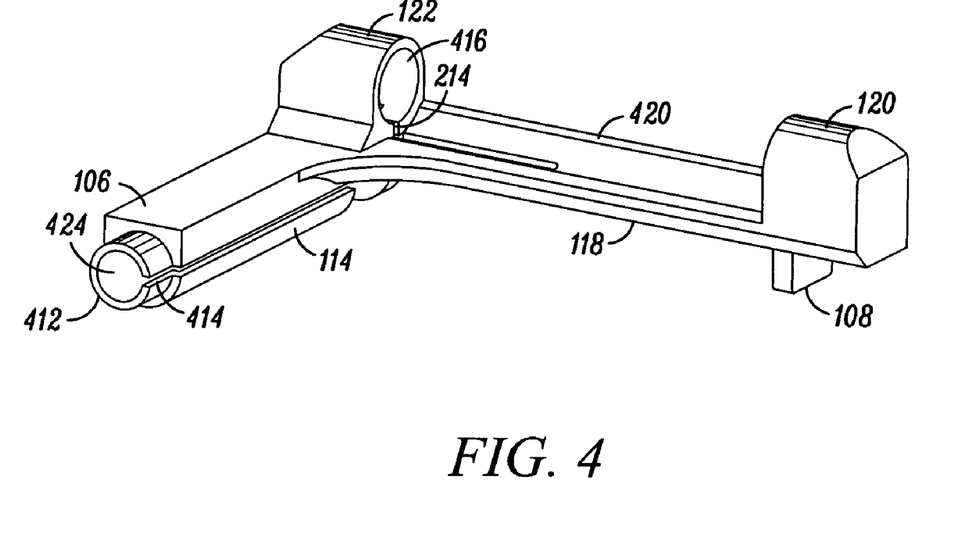
FIG. 4 is an exemplary perspective view of the hinge part of the present invention.

FIG. 4 shows a proximal opening 416 formed in the proximal pivot block 122. A distal opening 812 (See FIG. 8), which is similar to and coaxial with the proximal opening 416, is formed in the distal pivot block 120. In the illustrated embodiment, the openings 416, 812 receive mating pins (not illustrated), which extend from the display member 102 to pivotally support the display member 102, while permitting passage of the electrical conductor 612 (see FIG. 6). As those of ordinary skill in the art will recognize, these parts can be reversed such that pins extend from the pivot blocks 120, 122 and fit within corresponding openings formed in the display member 102 to achieve the same result. Further, other known hinge mechanisms can be employed to couple the display member 102 to the hinge part 106. In addition, a detent mechanism can be provided to cause the display member 102 to resist motion at a predetermined position or positions in its travel range, which is known in the art. To reduce costs, the upper hinge 130 for connecting the display member 102 to the pivot blocks 120, 122 can use conventional hinge parts.

Figure 5:
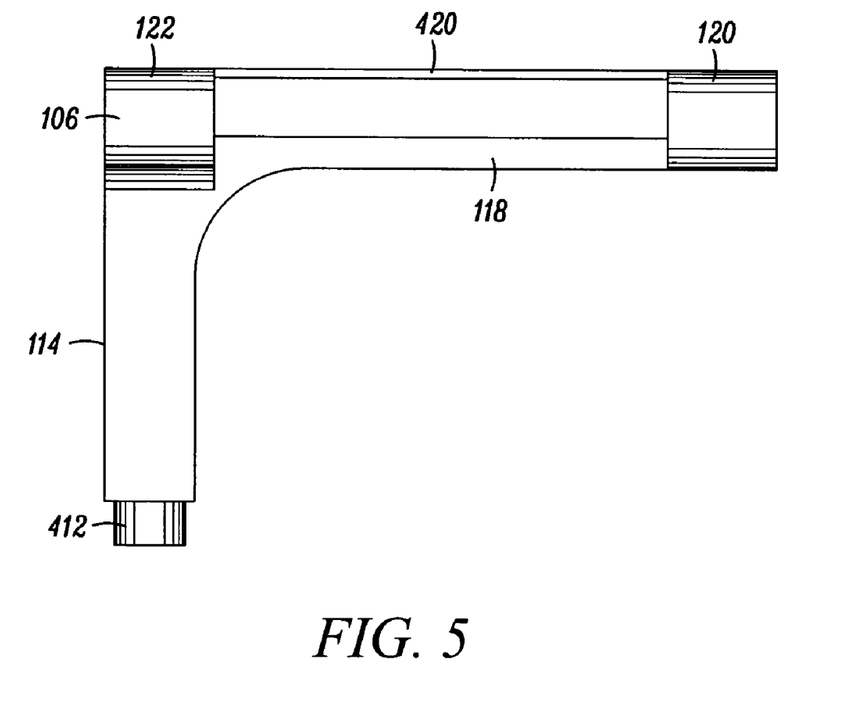
FIG. 5 is a plan view of the hinge part of FIG. 4.
Figure 6:
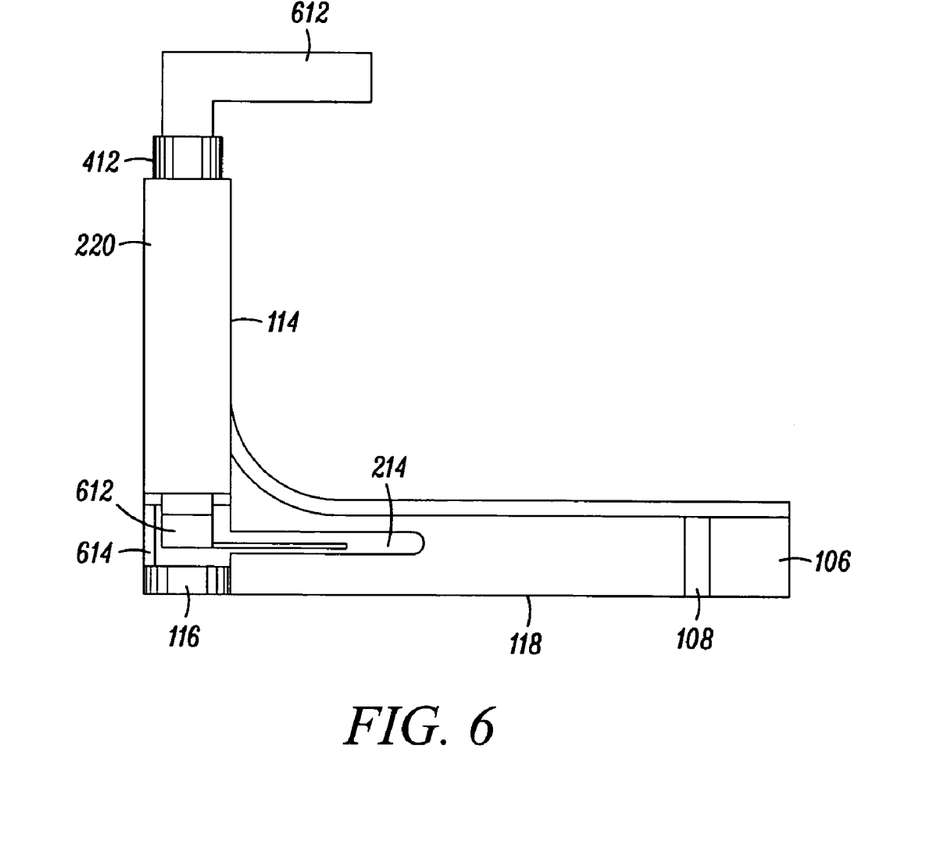
FIG. 6 is a bottom plan view of the hinge part of FIG. 6.
Figure 7:
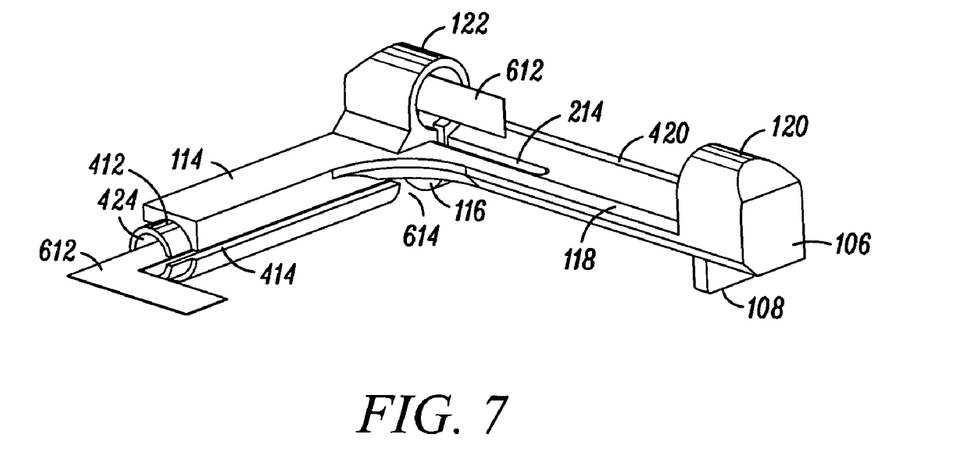
FIG. 7 is a another perspective view of the hinge part of FIG. 6.

FIGS. 4-7 show the hinge part 106 separated from the base 104 and the display member 102. In FIGS. 4 and 7, the cover 220 has been omitted to show the underlying details of an embodiment of the hinge part 106.

FIG. 4 shows a sleeve 412 formed at the distal end of the lower hinge member 114. The sleeve 412 forms a bearing surface for pivotally supporting the lower hinge member 114 in the outer hinge block 128. As one of ordinary skill in the art will recognize, other bearing structures can be employed to pivotally support the lower hinge member 114. For example, in an opposite configuration, a sleeve can be formed on the base 104 to fit into a mating opening of the lower hinge member 114.

Within the sleeve is an end of a conduit, or passage 424, for carrying an electrical conductor 612 (See FIG. 6). The passage 424 extends from the sleeve 412 to the opening 416 in the proximal pivot block 122. The electrical conductor 612 serves to connect electrical components (not illustrated) within the base 104 to electrical components in the display member 102, e.g. display 216. That is, the electrical conductor 612 can carry signals to drive the display 216, a speaker, and the like for example. A lower slot 414 can be formed in an inner side of the lower hinge member 114. The upper slot 214 and the lower slot 414 facilitate installation of the electrical conductor 612 in the hinge part 106. That is, the electrical conductor 612 can be fitted laterally, or edgewise, into the slots 214, 414 during the assembly process, which may be easier than threading an electrical conductor into the passage 424 from end to end, depending on the nature of the chosen electrical conductor.

Other similar openings can be formed in the hinge part 106 to permit an electrical conductor to be installed in the passage 424 according to the type and nature of the electrical conductor. For example, an opening can be formed in the upper surface of the lower hinge member 114 to facilitate routing of the electrical conductor 612, and the opening can subsequently be covered with a cover for aesthetics, since the upper surface of the lower hinge member 114 is visible to users in the portrait mode of FIG. 3.

A limit surface 420 can be formed on the upper hinge member 118, as shown in FIGS. 4 and 5. The limit surface 420 limits the travel of the display member 102 in the portrait mode. That is, the limit surface 420 directly contacts the outer surface of the display member 102 when the display member 102 is moved to its fully open position and thus prevents further movement of the display member 102.

Figure 8:
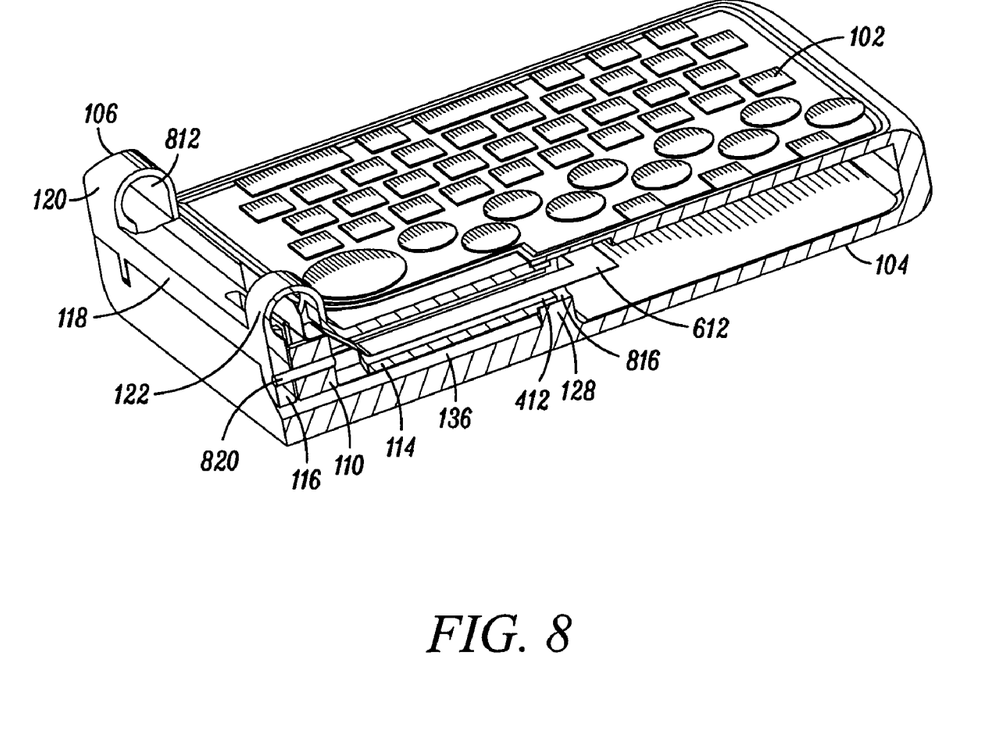
FIG. 8 is an isometric cross sectional view of a base and hinge part of the electronic device of FIG. 1.

FIG. 6 shows the underside of the hinge part 106, which can be visible to the user, for example, in the landscape mode of FIG. 2. FIG. 6 also shows a cavity 614 in which the inner hinge block 110 fits when the hinge part 106 is fitted to the base 104. As shown in FIG. 6, the electrical conductor 612 is a flat, flexible conductor strip in the illustrated embodiment. The electrical conductor 612 is bent and routed to follow the path of the passage 424 while avoiding contact with the inner hinge block 110 (FIG. 8). The cover 220 can be used to hide the lower slot 414 from view in the landscape mode of FIG. 2. FIG. 7 shows the hinge part 106 without the cover 220, which makes the lower slot 414 visible.

FIG. 8 shows a bearing opening 816 formed in the outer hinge block 128 to receive the sleeve 412. The surface defining the bearing opening 816 is a smooth bearing surface that mates with the outer surface of the sleeve 412 to support the sleeve 412 such that the sleeve 412 can rotate when the lower hinge 132 operated. Thus, the bearing opening 816 is coaxial with the sleeve 412, the pintle 820 and the pintle opening 126. This bearing arrangement allows the electrical conductor 612 to pass from the passage 424 to the interior of the base 104 without interference wit the bearing formed by the sleeve 412 and the bearing opening 816. As discussed above, the lower hinge 132 can be a friction hinge. Thus, the fit between the bearing opening 816 and the sleeve 412 can be adjusted to provide the desired degree of friction to hold the display member 102 in position. Other types of bearings can be employed without departing from the teachings of the present invention.

FIG. 8 shows the entire passage 424 and the electrical conductor 612 positioned within the passage 424. The electrical conductor 612 is flexible and arranged such that it is not harmed by the motion of either the upper hinge 130 or the lower hinge 132. Further, the electrical conductor 612 is constructed and arranged so that it does not interfere with the movement of the hinges 130, 132. In the illustrated embodiment, the electrical conductor 612 extends at approximately a forty-five degree angle from the lower hinge member 114 to the opening 416 within the proximal pivot block 122. Thus, the electrical conductor 612 avoids interference with the inner hinge block 110. Other routing methods can be employed with similar results. Although a flexible conductor strip is employed as the electrical conductor 612 in the illustrated embodiment, other types of wires or cables can be employed as long as they flex or otherwise accommodate the motion of the hinges 130, 132.

FIG. 8 also shows the pintle 820 which is fitted in the hole 126 and engages both the end support 116 and the inner hinge block 110. Although not illustrated, the pintle 820 can be flattened at each end to retain it. Although the pintle 820 is supported at one end by the end support 116 and at the opposite end by the inner hinge block 110, if additional support of the pintle 820 is desired, the hinge part 106 could be modified such that the pintle 820 is supported at both ends by the lower hinge member 114 while extending through the inner hinge block 110. Alternatively, the locations of the end support 116 and the inner hinge block can be reversed, which is readily apparent to those of ordinary skill in the art.

Referring to FIGS. 1 and 8, in the landscape mode, the travel of the display member 102 can be limited by contact between the lower hinge member 114 and the base 104. For example, the part of the base 104 that lies below the lower hinge member can include a chamfered surface 136 (see also FIG. 1) or a raised surface (not shown) to set an appropriate limit for the travel of the display member 102.

In the drawings, the portrait and landscape modes are shown to be independent, with only one of the hinges 130, 132 being used at a given time. However, both hinges can be employed simultaneously in, for example, a camera mode or video mode. That is, a camera can be integrated into the base 104 such that a lens (not shown) is located in an end of the base 104 just below the upper hinge member 118. In other words, the lens can be located in the surface of the base 104 that faces upward in FIG. 3. Thus, the base 104 can be gripped by a user to aim the lens, and the display 216 serves a viewfinder. By pivoting the display member 102 about both hinges 130, 132 the user has more flexibility to adjust the display to avoid glare, for example. Thus, both hinges 130, 132 can operate at the same time in certain circumstances.

In the illustrated embodiment, the proximal end of the lower hinge 132 is directly beneath the proximal end of the upper hinge 130. However, this configuration is not required. The lower hinge 132 can be located further away from the upper hinge 130 in the axial direction of the lower hinge 132. Therefore, while the axis of the hinges 130, 132 cross one another and lie in different planes, the upper hinge 130 need not directly overlie the lower hinge 132 as shown in the drawings, as those of ordinary skill in the art will recognize.

The apparatus and methods discussed above and the inventive principles thereof are intended to and will alleviate problems with conventional hinge mechanisms and will contribute to user satisfaction. It is expected that one of ordinary skill given the above described principles, concepts and examples will be able to implement other alternative procedures and constructions that offer the same benefits. It is anticipated that the claims below cover many such other examples. For example, although the lower hinge 132 is employed in the landscape mode and the upper hinge 130 is employed in the portrait mode, the lower hinge 132 and the upper hinge 130 can be reversed to perform opposite roles. That is, the upper hinge 130 can be configured to extend along the side of the electronic device 100 to operate in the landscape mode, and the lower hinge 132 can be configured to extend along the end of the electronic device 100 to operate in the portrait mode.

The disclosure is intended to explain how to fashion and use various embodiments in accordance with the invention rather than to limit the true, intended and fair scope and spirit thereof. The forgoing description is not intended to be exhaustive or to limit the invention to the precise form disclosed. Modifications or variations are possible in light of the above teachings. The embodiments were chosen and described to illustrate the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A hinge part of an electronic device that includes a base and a hinged component, wherein the hinge part rotatably connects the hinged component to the base, and wherein the hinge part comprises:
   a first hinge member that is adapted to rotate with respect to the base, wherein the first hinge member defines a first hinge axis, encompasses a passage disposed about the first hinge axis, and further comprises a slot disposed along the first hinge axis and arranged to provide access to the passage; and
   a second hinge member that is fixed to the first hinge member, wherein the second hinge member defines a second hinge axis, which is perpendicular to the first hinge axis, and wherein the second hinge axis lies in a different plane than the first hinge axis.

2. The hinge part of claim 1 further comprising a conduit formed in the hinge part to permit passage of an electrical conductor, the conduit including the passage.

3. The hinge part of claim 1, wherein the hinge part is generally L-shaped.

4. The hinge part of claim 1, wherein an opening is formed in a distal end of the first hinge member to permit an electrical conductor to pass into the hinge part.

5. The hinge pert of claim 1, wherein the second hinge part includes a pair of pivot blocks, which are spaced apart from one another in the direction of the second axis.

6. The hinge part of claim 5, wherein the pivot blocks are adapted to mate with hinge parts of the hinged component to pivotally support the hinged component.

7. The hinge part of claim 5, wherein a conduit is formed through at least one of the pivot blocks to permit passage of an electrical conductor.

8. The hinge part of claim 5, wherein each of the pivot blocks forms part of a hinge for pivotally supporting the hinged component.

9. An electronic device comprising:
   a base;
   a flip; and
   a hinge part that rotatably connects the flip to the base, wherein the hinge part includes:
      a first hinge member that is rotatably connected to the base, wherein the first hinge member defines a first hinge axis and defines a first passage disposed along and intersected by the first hinge axis;
      a second hinge member that is fixed to the first hinge member, wherein the second hinge member defines a second hinge axis, which is perpendicular to the first hinge axis,
      wherein the second hinge axis lies in a different plane than the first hinge,
      wherein the second hinge member defines a second passage that is disposed along and intersected by the second hinge axis, the first and second passage included in a conduit through the hinge part, and
      wherein the hinge part is constructed to allow the flip to pivot with respect to the base about both the first hinge axis and the second hinge axis.

10. The electronic device of claim 9 wherein the conduit further comprises a connecting passage traversing within the hinge part between the first passage and the second passage, the conduit formed in the hinge part to permit passage of an electrical conductor that extends between the base and the flip.

11. The electronic device of claim 10 wherein the connecting passage includes a portion disposed at an angle of less than 90 degrees relative to the first hinge axis.

12. The electronic device of claim 9, wherein the hinge part is generally L-shaped.

13. The electronic device of claim 9, wherein a first hinge opening is formed in a distal end of the first hinge member to permit an electrical conductor to pass into the hinge part from the base.

14. The electronic device of claim 9, wherein the second hinge member includes a pair of pivot blocks, which are spaced apart from one another in the direction of the second axis.

15. The electronic device of claim 14, wherein the pivot blocks are pivotally coupled to the flip.

16. The electronic device of claim 14, wherein the conduit is formed through at least one of the pivot blocks to permit an electrical conductor to pass from the hinge part to the flip.

17. The electronic device of claim 14, wherein each of the pivot blocks forms part of a hinge for pivotally supporting a proximal end of the flip.

18. The electronic device of claim 14, wherein an opening is formed in a distal end of the first hinge member to permit an electrical conductor to pass into the hinge part.

19. The electronic device of claim 9, wherein the electronic device includes a housing, and the housing includes a right-angled corner, and the hinge part is located to conform with the right-angled corner such that the hinge part does not substantially project beyond the housing.

20. The electronic device of claim 9, wherein the electronic device is a mobile telephone and wherein the mobile telephone includes a housing, and the housing includes a right-angled corner between a side of the telephone and an end of the telephone, and the hinge part is located to conform to the right-angled corner such that the first hinge member extends along and conforms to a side of the phone and the second hinge member extends along and conforms to an end of the telephone such that the hinge part does not substantially project beyond the housing.

21. The electronic device of claim 9, wherein the flip is a display member that includes a display.

22. The electronic device of claim 9, wherein the base includes a keypad.

* * * * *